H. N. OTT AND C. W. BARTON.
MICROSCOPE.
APPLICATION FILED SEPT. 19, 1916.
1,360,571.
Patented Nov. 30, 1920.
2 SHEETS—SHEET 1.
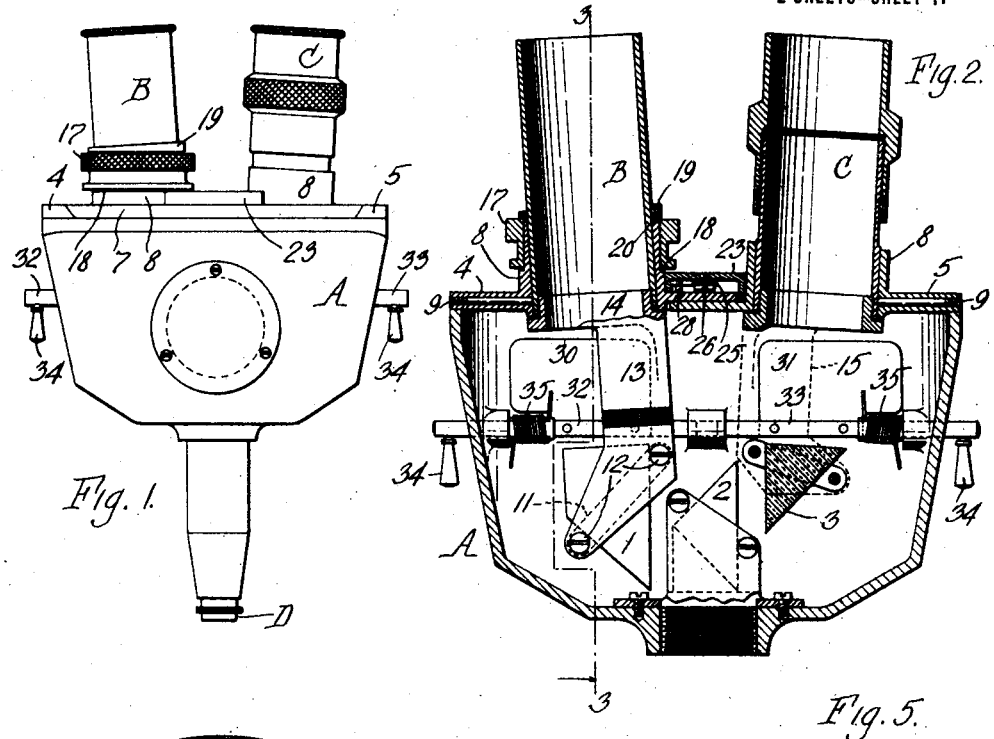
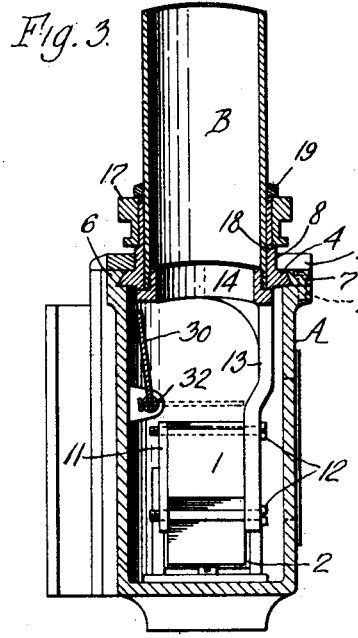
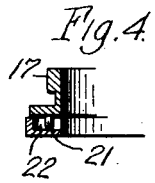
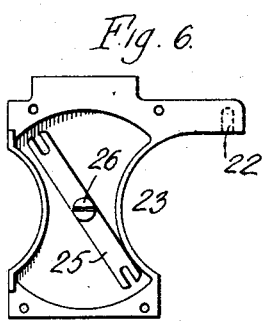
Inventors.
Harvey N. Ott
and Charles W. Barton
By Wilhelm & Parker
Attorneys

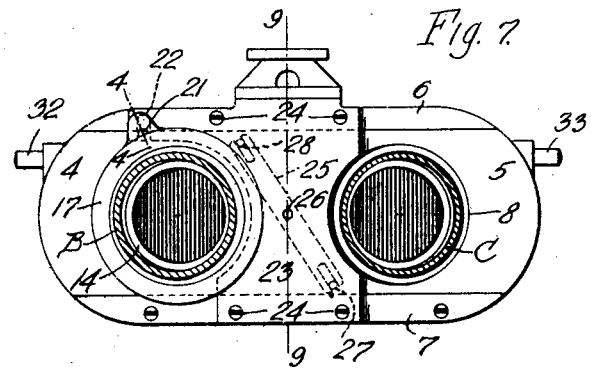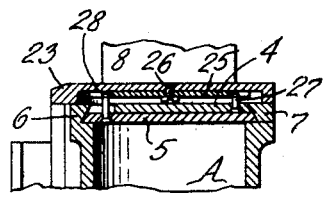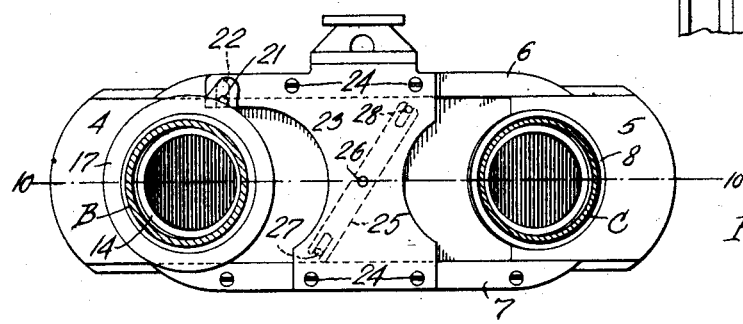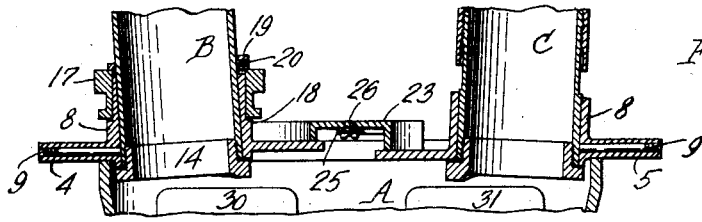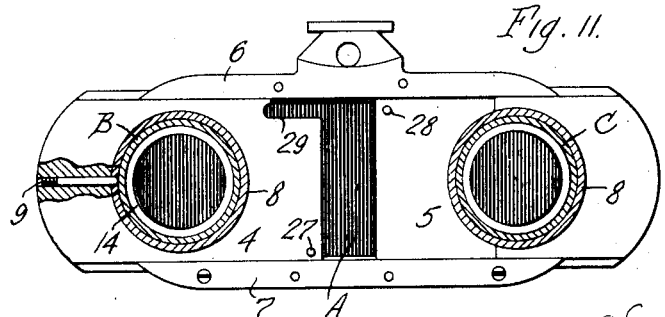

UNITED STATES PATENT OFFICE.

HARVEY N. OTT AND CHARLES W. BARTON, OF BUFFALO, NEW YORK, ASSIGNORS TO SPENCER LENS CO., OF BUFFALO, NEW YORK.

MICROSCOPE.

1,360,571.  Specification of Letters Patent.  Patented Nov. 30, 1920.

Application filed September 19, 1916. Serial No. 120,944.

*To all whom it may concern:*

Be it known that we, HARVEY N. OTT, a citizen of the United States, and CHARLES W. BARTON, a subject of the King of Great Britain, both residing at Buffalo, in the county of Erie and State of New York, have invented a new and useful Improvement in Microscopes, of which the following is a specification.

This invention relates to improvements in binocular microscopes and more particularly to the arrangement of the eye-pieces and means for adjusting the pupillary distance between the eye-pieces in such instruments.

One object of the invention is to produce a binocular microscope of simple and desirable construction in which the pupillary distance between the eye-pieces can be adjusted to suit the eyes of different users, and in which the arrangement of the eye-pieces is such that it is not necessary for the user to readjust his eyes to different angles in order to view objects through the microscope and with the naked eyes when looking at near objects. Other objects of the invention are to provide efficient means of simple construction whereby the eye-pieces can be easily and conveniently adjusted to regulate, as required, the pupillary distance between the same and also to provide the instrument with shutters or devices which can be readily operated to shut off either eye-piece so that the user can view the object with either eye singly whenever desired.

In the accompanying drawings:

Figure 1 is a front elevation of the body of a binocular microscope embodying the invention.

Fig. 2 is a longitudinal sectional elevation thereof on an enlarged scale, the objective tube being omitted.

Fig. 3 is a transverse sectional elevation thereof on line 3—3, Fig. 2.

Fig. 4 is a sectional detail of the eye-piece adjusting device on line 4—4, Fig. 7.

Fig. 5 is a plan view, detached, of a cover plate for the eye-piece slides.

Fig. 6 is a bottom plan view thereof.

Fig. 7 is a plan view partly in section of the microscope body showing the eye-pieces close together.

Fig. 8 is a similar view showing the eye-pieces adjusted outwardly away from each other.

Fig. 9 is a sectional elevation of the eye-piece adjusting mechanism on line 9—9, Fig. 7, but showing the eye-pieces in an intermediate position.

Fig. 10 is a fragmentary longitudinal sectional elevation of the instrument on line 10—10, Fig. 8.

Fig. 11 is a plan view partly in section thereof, leaving off the cover plate and operating lever for the eye-piece slides.

In the drawings only the body portion of the microscope, including the body tube or casing with the eye-pieces and objective carried thereby are illustrated, the other parts of the instrument which are not necessary to an understanding of the invention being omitted.

A represents the hollow body or casing of the microscope, B and C the eye-piece tubes which are furnished with eye-pieces, and D the objective which depends from the casing and coöperates with both eye-pieces. Except as hereinafter described, these parts may be of any usual or suitable construction.

In the instrument shown, the body casing A contains prisms shown at 1, 2 and 3, for dividing the light from the object and directing the same to the two eye-pieces. The eye-pieces converge downwardly toward the objective and the prisms 1 and 3 are so shaped that the light rays reflected to them from the intermediate prism 2 will be properly directed into the eye-pieces, parallel with the axes thereof. For example, the prisms 1 and 3 have upright faces parallel with the upright faces of the intermediate prism 2, top faces perpendicular to the axes of the respective eye-pieces, and oblique faces which are inclined at the appropriate angles to said upright and top faces. The lower inclined face of the intermediate prism 2 has a thin silver coating which both reflects the light rays to the prism 1 and permits the passage of rays for reflection by the upper inclined surface of the prism 2 to the prism 3. By the employment of converging eye-pieces as shown, the user can look from a nearby object to an object through the microscope without readjusting his eyes to a different angular relation as is necessary when using a microscope having parallel eye-pieces. It is, therefore, much easier for one to use the microscope with the converging eye-pieces than one having parallel eye-pieces.

The eye-pieces B and C are carried by slides or plates 4 and 5 which are mounted on the upper end of the casing A to move relatively to each other for adjusting the pupillary distance between the eye pieces. These plates are preferably arranged to slide horizontally toward and from each other between parallel horizontal guides 6 and 7 on the upper end of the casing A. As shown, the guides are undercut or beveled to coöperate with the correspondingly beveled edges of the eye-piece slides and one of the guides 6 is formed by an integral flange on the casing while the other guide 7 is formed by a separate bar secured by screws on the casing. The inner ends of the slides 4 and 5 are adapted to overlap or pass one beneath the other in the movement of the slides and for this purpose are preferably made of reduced thickness. The eye-pieces can be secured on the carrying slides in any suitable way, for instance each slide is provided with a fixed upright tubular part or nipple 8 in which the eye-piece tube is secured as by a set screw 9 in a hole in the outer end of the slide. The prisms 1 and 3 are independently supported from the slides 4 and 5 so that these prisms will move with the eye-pieces when the latter are adjusted. As shown, the prism 1 is secured, as by a clamping plate 11 and screws 12 on a leg or bracket 13 which is secured by a screw ring 14 to the lower end of the eye-piece tube B and depends therefrom into the casing A, and the prism 3 is similarly suspended from the other eye-piece C by a leg or bracket 15. The prisms 1 and 3 are thus connected to the eye-pieces so as to move therewith toward and from the coöperating intermediate prism 2 when the eye-pieces are adjusted toward and from each other and each eye-piece with its coöperating prism is mounted on the companion eye-piece slide and is adapted to be removed therewith as a unit from the instrument. The described manner of mounting the eye-pieces and the prisms enables the use of the converging eye-pieces and permits the adjustment of the same for pupillary distance by means of a much simpler construction than heretofore used.

For adjusting the eye-pieces toward and from each other an adjusting ring 17 surrounds the eye piece B, being arranged to revolve on the securing nipple 8 for this eye-piece. This adjusting ring is shown as being retained on the nipple against a shoulder 18 thereon as by a collar 19 secured by a set screw 20 on the eye-piece tube at the upper end of the nipple. The adjusting ring is provided preferably at the rear side thereof with a fulcrum pin 21, Figs. 4, 7 and 8, which enters a slot 22 in a fixed part on the top of the prism casing. Preferably, this slot is formed in a cover plate 23, which is secured on the casing A over the eye-piece slides and extends across the upper end of the casing between the eye-pieces, being stationarily secured in place by screws 24 or other fastenings. The periphery of the adjusting ring is preferably knurled or roughened so that it can be readily turned. By turning the adjusting ring in one direction the fulcrum pin on the same being confined in the slot 22, causes the eye-piece B to move outwardly while by rotating the ring in the opposite direction the slide with the eye-piece thereon is moved inwardly. For causing a corresponding opposite movement of the slide carrying the other eye-piece C so that the two eye-pieces are moved simultaneously in opposite directions toward and from each other, a lever 25 is provided connecting the two eye-pieces. As shown, this lever is fulcrumed between its ends by a screw 26 in a recess or cavity in the under side of the coverplate 23 and is provided at its opposite ends with slots into one of which extends a pin 27 on the slide 4, while a corresponding pin 28 on the other side 5 extends into the slot in the other end of the lever. When the slide 4 is moved by turning the adjusting ring 17, the pin thereon engaging the lever 25 swings the lever and thereby causes an opposite movement of the other slide. The slide 4, as shown in Fig. 11, is slotted at 29 to provide space for the movement of the pin 28 on the other slide.

The described adjusting mechanism is very desirable with the eye-pieces arranged as described. The adjusting ring surrounding one of the eye-pieces is convenient to reach and operate, much more so than would be an operating button or device between the eye-pieces and it does not occupy space between the eye-pieces, which should be left free for the nose of the user. This space is quite narrow when the eye-pieces are adjusted inwardly as far as necessary to suit the eyes of some users.

30, 31 represent two shutters arranged in the casing A and each adapted to be moved to a position to intercept the vision through one of the eye-pieces. These shutters preferably consist of thin plates fixed on independently movable rock shafts 32, 33, which are suitably journaled in the casing and are provided at their outer ends with handles 34 for rocking them. The shutters are normally held in the positions shown in which they do not obstruct the view through the eye-pieces, by suitable means such as springs 35 surrounding the rock shafts. Either shutter can be swung by rocking its shaft so as to extend crosswise below the lower end of the companion eye-piece and intercept the view through the eye-piece, thus enabling the user at any time to shut off the vision from one or the other eye for testing his vision.

We claim as our invention:—

1. In a microscope, the combination of a hollow body two eye-pieces movably mounted on said hollow body for adjustment toward and from each other, an adjusting device operatively mounted on one of said eye-pieces for adjusting the same, and connections between said eye-pieces for causing an equal but opposite adjustment of the other eye-piece when said adjusting device is operated.

2. In a microscope, the combination of two eye-pieces movably mounted for adjustment toward and from each other, and adjusting mechanism for causing equal but opposite adjustments of said eye-pieces including an operating ring which is arranged to rotate about the axis of one of said eye-pieces for effecting the adjustment.

3. In a microscope, the combination of two eye-pieces movably mounted for adjustment toward and from each other, an adjusting ring arranged to rotate about one of said eye-pieces for adjusting the same, and operative connections between said eye-pieces for causing an equal but opposite adjustment of the other eye-piece when said adjusting ring is turned.

4. In a microscope, the combination of two eye pieces, slides carrying said eye-pieces and arranged to slide toward and from each other for adjusting the pupillary distance between said eye-pieces, an adjusting ring arranged to rotate about one of said eye-pieces for adjusting the slide carrying the same, and operative connections between said slides for causing the simultaneous adjustment of the other slide when said adjusting ring is turned.

5. In a microscope, the combination of two eye-pieces, slides carrying said eye-pieces, a support on which said slides are mounted to slide toward and from each other for adjusting the pupillary distance between said eye-pieces, an adjusting ring mounted to rotate on one of said slides and having a fulcrum on said support for adjusting said slide, and operative connections between said slides for causing the simultaneous adjustment of the other slide when said adjusting ring is turned.

6. In a microscope, the combination of a body, an objective, two eye-pieces the optical axes of which converge toward the objective and are both movably mounted on the body to move toward and from each other for adjusting the pupillary distance between the eye-pieces, the angle of convergence of said eye-pieces remaining constant in all adjustments of the eye-pieces, and means for directing the image from the objective to the two eye-pieces and maintaining the distance through which the light rays travel from the objective to both eye-pieces always equal.

7. In a microscope, the combination of a body, an objective, two eye-pieces the optical axes of which converge toward the objective and are both movably mounted on the body to move in opposite directions in a substantially straight line toward and from each other for adjusting the pupillary distance between the eye-pieces, whereby the angle of convergence of the two eye-pieces remains the same in all adjustments of the eye-pieces, and means for directing the image from the objective to the two eye-pieces and maintaining the distance through which the light rays travel from the objective to both eye-pieces always equal.

8. In a microscope, the combination of an objective, two eye-pieces which converge toward the objective and are both mounted to move in opposite directions in a substantially common straight line toward and from each other for adjusting the pupillary distance between the eye-pieces, and ray directing means comprising two prisms which move with the eye-pieces and have faces perpendicular to the axes of the eye-pieces.

9. In a microscope, the combination with two eye-pieces and an objective, of a movable shutter for each eye-piece, and means for moving either of said shutters at will to a position to intercept the vision from its related eye-piece to the objective.

10. In a microscope, the combination with two eye-pieces, an objective and a connecting casing, of independently movable shutters in said casing, one for each eye-piece, and exterior operating devices for moving either of said shutters at will to a position to intercept the vision from its related eye-piece to the objective.

11. In a microscope, the combination with the eye-pieces, objective and connecting casing, of shutters in said casing, independently operable rock shafts to which said shutters are secured, and handles on said shafts exterior to the casing for rocking said shafts to turn the shutters to positions in which they intercept the vision from the eye-pieces to the objective.

12. In a microscope, the combination with the eye-pieces and the objective, of independently operable shutters, means which normally hold said shutters in inoperative positions, and exterior operating devices for moving the shutters to positions in which they intercept the vision from the eye-pieces to the objective.

Witness our hands this 15th day of September, 1916.

HARVEY N. OTT,
CHARLES W. BARTON.

Witnesses:
EDWARD E. TROUST,
LOUIS M. POTTER.